(12) United States Patent
Bogdanski (10) Patent No.: US 9,014,201 B2
(45) Date of Patent: Apr. 21, 2015

(54) SYSTEM AND METHOD FOR PROVIDING DEADLOCK FREE ROUTING BETWEEN SWITCHES IN A FAT-TREE TOPOLOGY

(71) Applicant: Oracle International Corporation, Redwood Shores, CA (US)

(72) Inventor: Bartosz Bogdanski, Oslo (NO)

(73) Assignee: Oracle International Corporation, Redwood Shores, CA (US)

( * ) Notice: Subject to any disclaimer, the term of this patent is extended or adjusted under 35 U.S.C. 154(b) by 243 days.

(21) Appl. No.: 13/653,303

(22) Filed: Oct. 16, 2012

(65) Prior Publication Data

US 2013/0114620 A1    May 9, 2013

Related U.S. Application Data

(60) Provisional application No. 61/557,722, filed on Nov. 9, 2011.

(51) Int. Cl.
*H04L 12/753* (2013.01)
*H04L 12/933* (2013.01)
*H04L 12/707* (2013.01)

(52) U.S. Cl.
CPC ............... *H04L 45/48* (2013.01); *H04L 49/15* (2013.01); *H04L 45/24* (2013.01)

(58) Field of Classification Search
CPC .......... H04L 45/24; H04L 45/48; H04L 49/15
USPC .................................. 370/351, 389, 400, 408
See application file for complete search history.

(56) References Cited

U.S. PATENT DOCUMENTS 6,931,103 B1 *   8/2005  Tasker et al. ................ 379/32.04
2008/0239983 A1 * 10/2008  Bivens et al. ................. 370/252

OTHER PUBLICATIONS

Sem-Jacobsen F. et al., Dynamic Fault Tolerance in Fat Trees, IEEE Transactions on Computers, IEEE Service Center, Los Alamitos, CA, US , vol. 60, No. 4, Apr. 1, 2011, pp. 508-525.*
Sem-Jacobsen F. et al., Dynamic Fault Tolerance in Fat Trees, IEEE Transactions on Computers, IEEE Service Center, Los Alamitos, CA, US, vol. 60, No. 4, Apr. 1, 2011, pp. 508-525.
Sem-Jacobsen F. et al., Combining Source Routing and Dynamic Fault Tolerance, Proceedings of the 18th International Symposium on Computer Architecture and High Performance Computing (SBAC-PAD'06), IEEE, PI, Oct. 1, 2006, pp. 151-158.
Sem-Jacobsen F. et al., Dynamic Fault Tolerance with Misrouting in Fat Trees, Proceedings of the 2006 International Conference on Parallel Processing (ICPP'06), IEEE, PI, Aug. 1, 2006, pp. 33-44.

(Continued)

*Primary Examiner* — Un C Cho
*Assistant Examiner* — Siming Liu
(74) *Attorney, Agent, or Firm* — Meyer IP Law Group (57) ABSTRACT

A system and method can support routing packets between a plurality of switches in a middleware machine environment, thereby supporting Internet Protocol (IP) based management traffic via enabling IP over Infiniband (IPoIB) communication in the middleware machine environment. The plurality of switches can perform routing for inter-switch traffic in the middleware machine environment using a first routing algorithm. Then, a switch in the middleware machine environment can be selected as a hub switch for inter-switch traffic that can not reach destination using the first routing algorithm. Furthermore, a routing table associated with the hub switch can be updated when a path exists between a source switch and a destination switch via the hub switch.

20 Claims, 4 Drawing Sheets

(56) References Cited

OTHER PUBLICATIONS

Bogdanski, B. et al., sFtree: A Fully Connected and Deadlock-Free Switch-to-Switch Routing Algorithm for Fat-Trees, ACM Transactions on Architecture and Code Optimization, vol. 8, No. 4, Article 55, Jan. 14, 2012, pp. 1-20.

European Patent Office, International Searching Authority, International Search Report and Written Opinion dated Mar. 14, 2013 for International Application No. PCT/US2012/064479, 12 pages.

* cited by examiner

SYSTEM AND METHOD FOR PROVIDING DEADLOCK FREE ROUTING BETWEEN SWITCHES IN A FAT-TREE TOPOLOGY

CLAIM OF PRIORITY

This application claims the benefit of priority on U.S. Provisional Patent Application No. 61/557,722, entitled "SYSTEM AND METHOD FOR PROVIDING DEADLOCK FREE ROUTING BETWEEN SWITCHES IN A FAT-TREE TOPOLOGY" filed Nov. 9, 2011, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to supporting switch-to-switch communication in a middleware machine environment.

BACKGROUND

The fat-tree topology is used for high performance computing (HPC) clusters today, and for clusters based on InfiniBand (IB) technology. For fat-trees, as with most other topologies, the routing algorithm is beneficial for efficient use of the network resources. However, the existing routing algorithms have a limitation when it comes to switch-to-switch communication. None of the existing routing algorithms support deadlock free and fully connected switch-to-switch communication which is beneficial for efficient system management. These are the generally areas that embodiments of the invention are intended to address.

SUMMARY

Described herein are systems and methods that can support routing packets between a plurality of switches in a middleware machine environment. The middleware machine environment can support Internet Protocol (IP) based management traffic via enabling IP over Infiniband (IPoIB) communication in the middleware machine environment. The plurality of switches can perform routing for inter-switch traffic in the middleware machine environment using a first routing algorithm. Then, a switch in the middleware machine environment can be selected as a hub switch for inter-switch traffic that can not reach destination using the first routing algorithm. Furthermore, a routing table associated with the hub switch can be updated when a path exists between a source switch and a destination switch via the hub switch.

DETAILED DESCRIPTION

Described herein are systems and methods that can support routing packets between a plurality of switches in a middleware machine environment. The middleware machine environment can support Internet Protocol (IP) based management traffic via enabling IP over Infiniband (IPoIB) communication in the middleware machine environment.
InfiniBand (IB) Network and Subnet Management In accordance with an embodiment of the invention, IB networks can be referred to as subnets, where a subnet consists of a set of hosts interconnected using switches and point-to-point links. An IB fabric can constitute one or more subnets, each of which can be interconnected using routers. Hosts and switches within a subnet are addressed using local identifiers (LIDs) and a single subset is limited to 49151 LIDs.

An IB subnet can have at least one subset manager (SM), which is responsible for initializing and bringing up the network, including the configuration of all the IB ports residing on switches, routers, and host channel adapters (HCAs) in the subnet. At the time of initialization, the SM starts in a discovering state where the SM does a sweep of the network in order to discover all switches and hosts. During the discovering state, the SM can discover other SMs and can negotiate for who should be the master SM. When the discovering state is complete, the SM enters a master state. In the master state, the SM proceeds with LID assignment, switch configuration, routing table calculations and deployment, and port configuration. The subnet is up and ready for use as soon as the master state is done, and the SM is responsible for monitoring the network for changes after the subnet has been configured.

Additionally, the SM can be responsible for calculating routing tables that maintain full connectivity, deadlock freedom, and proper load balancing between all source and destination pairs. Routing tables can be calculated at network initialization time and this process can be repeated whenever the topology changes in order to update the routing tables and ensure optimal performance.

During the normal operation, the SM performs periodic light sweeps of the network to check for topology change events, such as when a link goes down, when a device is added, or when a link is removed. If a change event is discovered during a light sweep or if a message (trap) signaling a network change is received by the SM, the SM can reconfigure the network according to the changes discovered. This reconfiguration can also include steps used during initialization.

IB is a lossless networking technology, where flow-control can be performed per virtual lane (VL). VLs are logical channels on the same physical link with separate buffering, flow-control, and congestion management resources. The concept of VLs makes it possible to build virtual networks on top of a physical topology. These virtual networks, or layers, can be used for various purposes such as efficient routing, deadlock avoidance, fault-tolerance and service differentiation.

Fat-Tree Routing

In accordance with an embodiment of the invention, a fat-tree topology is a layered network topology, e.g. a balanced fat-tree can have equal link capacity at every tier. Furthermore, the fat-tree topology can be implemented by building a tree with multiple roots, e.g. the m-port n-tree definition or the k-ary n-tree definition, which can be described using an XGFT notation.

A fat-tree routing algorithm can exploit the available network resources. The fat-tree routing algorithm can include two phases: the upward phase in which the packet is forwarded from the source, and the downward phase when the packet is forwarded towards the destination. The transition between those two phases occurs at the lowest common ancestor, which is a switch that can reach both the source and the destination through its downward ports. Such a routing implementation ensures deadlock freedom, and the implementation also ensures that every path towards the same destination converges at the same root (top) node, such that all packets toward that destination follow a single dedicated path in the downward direction. By having a dedicated downward path for every destination, contention in the downward phase is effectively removed (moved to the upward stage), so that packets for different destinations only contend for output ports in half of the switches on their path. Additionally, the downward path in oversubscribed fat-trees is not dedicated and can be shared by several destinations.

Switch-to-Switch Communication

In addition to the communication between end-nodes, the fat-tree topology allows switch-to-switch communication. When the switch-to-switch communication originates little traffic, the switch-to-switch communication may be ignored, or in other words, IB switches may be considered as transparent devices that can be safely ignored from the point of view of the routing algorithm.

On the other hand, the switch-to-switch communication traffic may not always be negligible. In these cases, the fat-tree routing described in the previous section can be used to route the switch-to-switch communication traffic with limitations, since the lowest common ancestor may need to be found in order to find a path between any two switches so that the traffic can be forwarded through the first available port. Moreover, the fat-tree routing scheme does not provide connectivity between those switches which do not have a lowest common ancestor, i.e. the fat-tree routing scheme described in the previous section may not provide full connectivity in the fat-tree topology.

Full connectivity in the fat-tree topology, including both the end-nodes and the switches, can be beneficial for various reasons. For example, IB diagnostic tools rely on LID routing and need full connectivity for basic fabric management and monitoring. Furthermore, advanced tools, such as perftest used for benchmarking, may employ IPoIB, which relies on the underlying LID routing and needs full connectivity. IPoIB is an encapsulation method that allows for running TCP/IP traffic over an IB network. Moreover, IPoIB may also be required by non-InfiniBand aware management and monitoring protocols and applications like SNMP or SSH. Thus, full connectivity between all the switches in a fabric can be beneficial since switches are able to generate arbitrary traffic, can be accessed like any other end-node, and often contain an embedded SM.

Deadlocks can occur in the fat-tree topology because network resources such as buffers or channels are shared.

Figure 1:
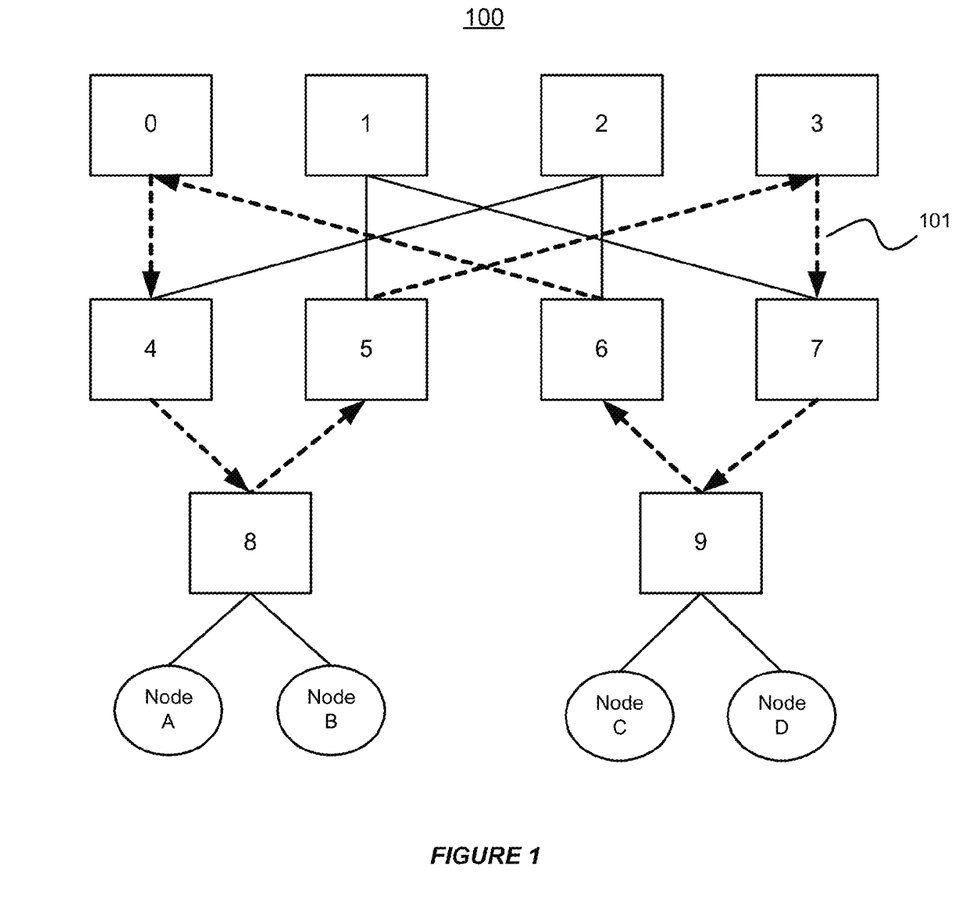
FIG. 1 shows an illustration of an exemplary scenario when a deadlock occurs in a middleware machine environment.

FIG. 1 shows an illustration of an exemplary scenario when a deadlock occurs in a middleware machine environment. As shown in FIG. 1, a fat-tree topology 100 in the middleware machine environment allows a mixed communication pattern with two switch-to-switch communication pairs (switch 0 to switch 3, and switch 3 to switch 6) and two node-to-node communication pairs (node B to node D, and node D to node A). Here, the traffic from switch 0 to switch 3 is directed via switches 4, 8, and 5, and the traffic from switch 3 to switch 6 is directed via switches 7 and 9. Also, the traffic from node B to node D is directed via switches 8, 5, 3, 7, and 9, and the traffic from node D to node A is directed via switches 9, 6, 0, 4, and 8.

As shown in the dashed lines in FIG. 1, a cycle credit dependency, or a credit loop 101, is created when the above mixed communication pattern exists in a fat-tree topology 100. Furthermore, a deadlock can happen when a cyclic credit dependency is created. This does not mean that whenever a cyclic credit dependency is present, there will always be a deadlock. In other words, the creation of a cyclic credit dependency makes the deadlock occurrence possible. For example, when a routing algorithm such as minhop is used, a deadlock may occur in a 3-stage fat-tree with node-to-node and switch-to-switch traffic. This is because minhop is unable to solve a ring of 5 nodes or bigger in a deadlock free manner, and a 3-stage fat-tree may contain a 6-node ring. Thus, there is a need for an algorithm that can provide deadlock free routing in fat-tree topologies when switch-to-switch communication between all switches is present.

Deadlocks can be avoided by using VLs that segment the available physical resources. However, using VLs for implementing deadlock avoidance in fat-trees can be inefficient because the additional VLs can be used for other purposes like quality of service (QoS).

For example, the LASH algorithm for IB can support full connectivity and deadlock freedom. The LASH algorithm uses VLs to break the credit loop 101, and provides full connectivity between all the nodes in the fabric. LASH does not exploit the properties of the fat-trees when assigning the paths, thus, allows worse network performance than ordinary fat-tree routing, and, additionally, LASH has a long routing time. DFSSSP is another routing protocol that may be used to support all-to-all switch-to-switch communication in fat-trees. However, DFSSSP does not break credit loops between non-HCA nodes, which means that switch-to-switch communication may not be deadlock free.

Thus, when a deadlock occurs in an interconnection network, the deadlock can prevent communication in part, or all, of the network. Therefore, from the system-wide perspective of an interconnection network, full connectivity supported in a fat-tree topology is preferably deadlock free.

Deadlock Free Routing in a Single-Core Fat-Tree Topology

In accordance with an embodiment of the invention, full connectivity can be supported between the nodes in the middleware machine environment, and deadlock freedom can be achieved for the whole fabric only using a single VL.

Figure 2:
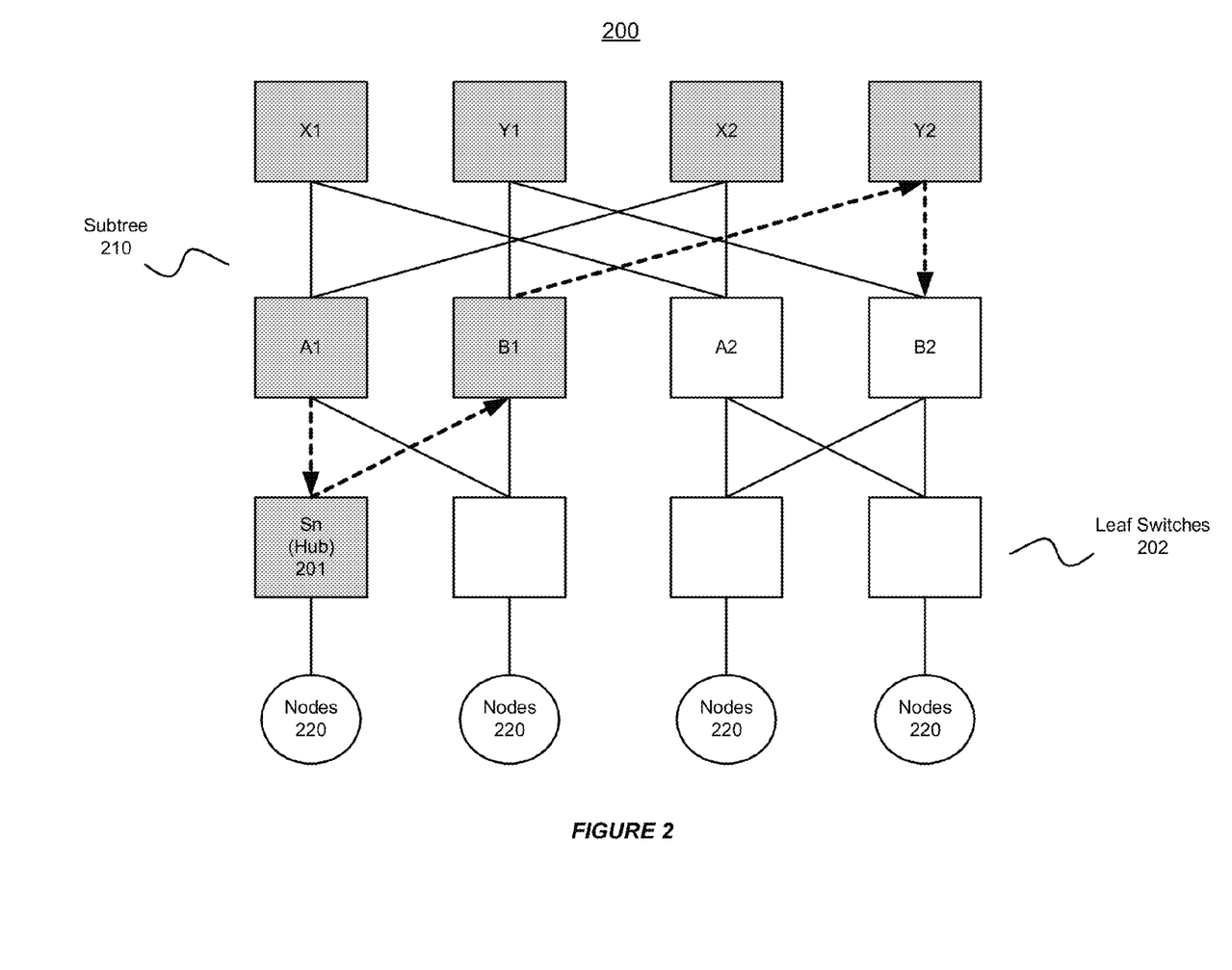
FIG. 2 shows an illustration of providing deadlock free routing between switches in a single-core fat-tree topology in accordance with an embodiment of the invention.

FIG. 2 shows an illustration of providing deadlock free routing between switches in a single-core fat-tree topology in accordance with an embodiment of the invention. As shown in FIG. 2, a single-core fat-tree topology 200 in the middleware machine environment can include a plurality of switches. Furthermore, the middleware machine environment can include a plurality of end-nodes 220, such as server nodes, that connect to the leaf switches 202 in the fat-tree topology 200.

An up/down turn model can be used to provide fat-tree routing in the middleware machine environment. For example, the switches A1 and A2 can have connectivity by going up through X1 or X2. On the other hand, the up/down turn model may not be useful for the communication between switches, e.g. A1 and B1, that do not have a lowest common ancestor.

In accordance with an embodiment of the invention, an alternative approach can be employed to achieve connectivity between switches that can not establish communication using the up/down turn model. As shown in FIG. 2, an upside down tree, or a subtree 210 (shown in shadowed area), can be created in the fat-tree topology 200. The subtree 210 can have a subtree root node, Sn, or a hub switch 201, which is a leaf switch in the fat-tree topology 200. Full connectivity can be established through the hub switch 201 in the fat-tree topology 200.

Within the subtree 210, the switches X1 and Y1 can communicate through the subtree root, Sn 201, whereas X1 and X2 can communicate through switch A1. Furthermore, switches external to the subtree 210 can communicate with other switches in the fat-tree topology 200 through the subtree 210, which leads to the usage of non-shortest (or suboptimal) paths. A switch in the fabric that cannot reach another switch using the up/down turn model, can first send the packets to the subtree 210. Then, the packets can be passed down in the subtree 210 until they reach a switch that has a path to the destination switch. In other words, the packets make a U-turn in the hub switch 201, i.e. a down to up turn followed by a up to down path towards the destination. The subtree 210 in the middleware machine environment can localize all the down/up turns in a fabric to a single, deadlock free tree.

For example, when a request is received to route one or more packets from a first switch, e.g. A1, to a second switch, e.g. B2, in the middleware machine environment, the system can first determine whether a routing table associated with the subtree root switch, or the hub switch 201, contains a path to the second switch, B2. As shown in FIG. 2 in dashed lines, the hub switch 201 can connect to the second switch, B2, via a path through B1, Y1 or Y2. Then, the path to the second switch, B2, can be inserted into a routing table associated with the first switch, A1. Additionally, in the routing table associated with A1, an output port for switch A2 can set to be the same as the output port for the hub switch 201.

The root of the upside down subtree 210 can be any of the leaf switches. Furthermore, all the switches in the fat-tree topology 200 can collectively choose a leaf switch for communication, in order to achieve deadlock free full connectivity in the middleware machine environment.

In accordance with an embodiment of the invention, the deadlock freedom can be achieved in the fat-tree topology 200 by requiring that all U-turns take place only within the subtree 210, and that any up to down turn will direct the traffic leaving the subtree 210. Additionally, traffic leaving the subtree 210 may not be able to circulate back into the subtree 210, because no U-turn outside of the subtree 210 is allowed.

Thus, in a single-core fat-tree 200, there can always be a path that connects from a source switch to a hub switch 201, and connects from the hub switch 201 to every destination switch. Furthermore, the communication scheme for achieving connectivity through a leaf switch in the topology does not change the upward to downward paths between the switches that can reach each other using the fat-tree routing.

Attached is Appendix A that provides further information regarding supporting routing between switches in a middleware machine environment and various aspects of the platform described throughout this disclosure. The information in Appendix A is provided for illustration purposes and should not be construed to limit all of the embodiments of the invention.

Deadlock Free Routing in a Multi-Core Fat-Tree Topology

In accordance with an embodiment of the invention, connectivity may not always exist between two switches in a complex multi-core fat-tree, or an irregular fat-tree. A best-effort approach can be employed in these cases to route switch-to-switch communication.

Figure 3:
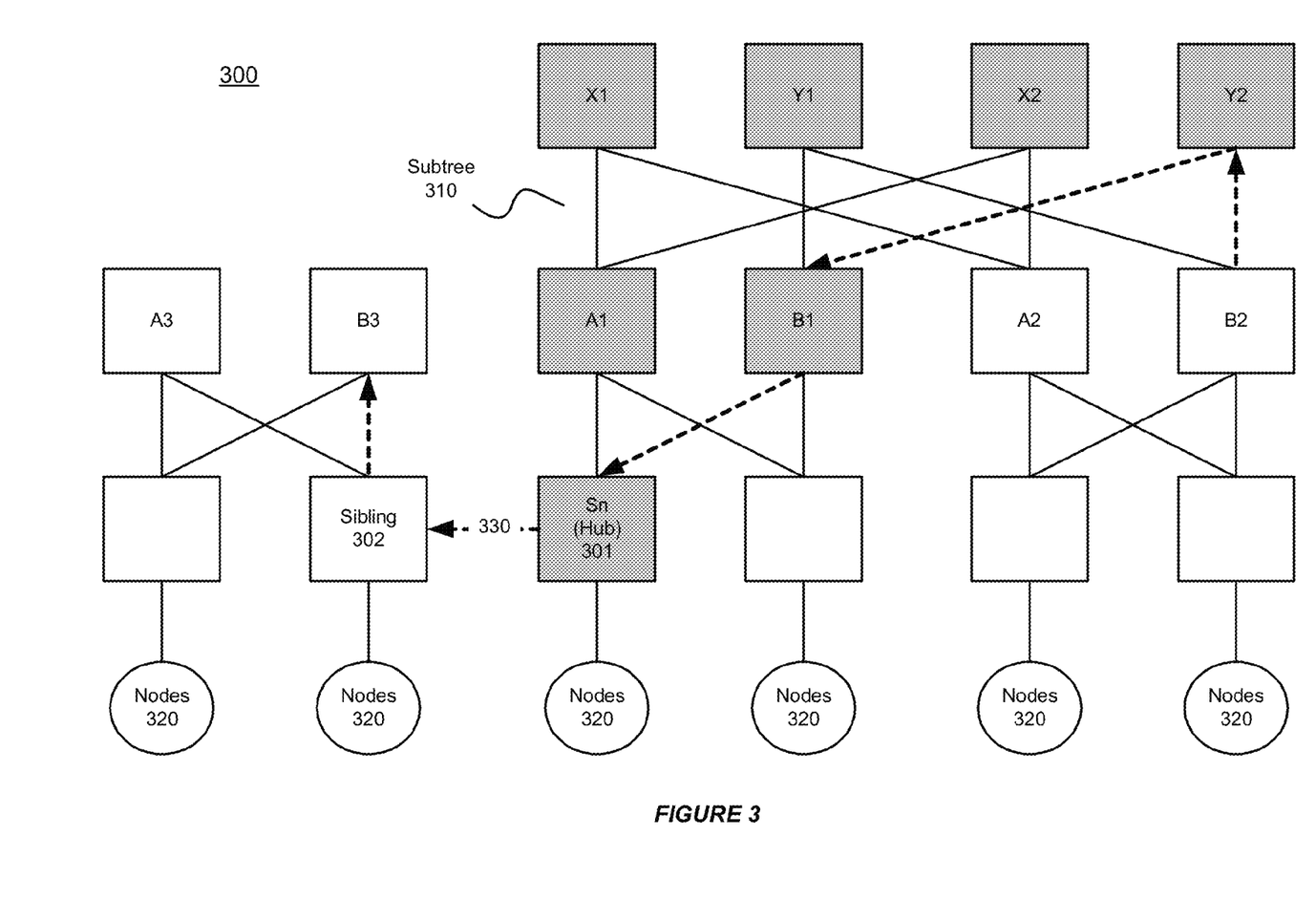
FIG. 3 shows an illustration of providing deadlock free routing between switches in a multi-core fat-tree topology in accordance with an embodiment of the invention.

FIG. 3 shows an illustration of providing deadlock free routing between switches in a multi-core fat-tree topology in accordance with an embodiment of the invention. As shown in FIG. 3, a multi-core fat-tree topology 300 in the middleware machine environment can include a plurality of switches. Furthermore, the middleware machine environment can include a plurality of end-nodes 320, such as server nodes that connect to the leaf switches in the fat-tree topology 300.

Similarly, an upside down tree, or a subtree 310 (shown in shadowed area), can be created in the fat-tree topology 300. The subtree 310 can have a subtree root node, Sn, or a hub switch 301, which is a leaf switch in the fat-tree topology 300. Unlike in FIG. 2, the subtree root switch or the hub switch 301 may not have paths to all destinations.

Additionally, a sibling switch 302 can exist in the middleware machine environment and can connect with the subtree root switch, Sn, or the hub switch 301 through a horizontal link 330.

In one example, a first switch, e.g. B2, can request to route one or more packets to a second switch, e.g. B3, in the middleware machine environment. The subtree root switch 301 does not have a path connecting to B3, since B3 is located in a separate fat-tree that only connects with the other nodes via a horizontal link.

The system can first check whether the subtree root switch 301 has a sibling switch 302 whose routing table contains a path to B3. Then, the system can set a path to the second switch, B3, on the first switch, B2, and the subtree root switch 301 through said sibling switch 302. As a result, the system can be configured to route a packet initiated from switch B2 to switch B3, for example, via Y1 or Y2, B1, subtree root node 301, and its sibling node 302 (shown in dashed lines).

SFTREE Algorithm

In accordance with an embodiment of the invention, a routing algorithm, i.e. the SFTREE algorithm, can be used to achieve deadlock free full connectivity between the switches. The SFTREE algorithm can include two steps: a first step to find the subtree root Sn, which can be one of the leaf switches, and a second step to perform the switch-to-switch routing.

The following Algorithm 1 includes pseudo code for finding a subtree root and establishes the subtree.

---
Algorithm 1 Select a subtree root function
---
Require: Routing table has been generated.
Ensure: A subtree root ($sw_{root}$) is selected.
 1: found = false
 2: for $sw_{leaf}$ = 0 to max__leaf__sw do
 3:   if found = = true then
 4:     break
 5:   end if
 6:   $sw_{root}$ = $sw_{leaf}$
 7:   found = true
 8:   for dst = 1 to max__dst__addr do
 9:     if $sw_{root}$.routing__table[dst] = = no__path then
10:       found = false
11:       break
12:     end if
13:   end for
14: end for
15: if found = false then
16:   $sw_{root}$ = get__leaf (0)
17: end if Algorithm 1 traverses all the leaf switches in the topology, and for each leaf switch checks whether any of the switch destination addresses are marked as unreachable in its routing table. If all the switch destinations in the routing table are marked as reachable, the first encountered leaf switch is selected as a subtree root switch. Furthermore, there can be as many potential subtrees in a fat-tree as there are leaf switches having full connectivity. Only one of those leaf switches may be selected as the subtree root and there may be only one subtree with a root in this particular leaf switch.

The following Algorithm 2 includes pseudo code for performing switch-to-switch routing in the fat-tree topology.

---

Algorithm 2 Switch-to-switch routing function

Require: Subtree root ($sw_{root}$)
Ensure: Each $sw_{src}$ reaches each $sw_{dst}$ at worst by $sw_{root}$.
1: if found or $sw_{root}$.routing_table[dst] ≠ no_path then
2:     port = $sw_{src}$.routing_table[$sw_{root}$.addr]
3:     $sw_{src}$.routing_table[dst] = port
4:     get_path_length ($sw_{src}$, null, dst, $sw_{root}$, hops)
5:     set_hops ($sw_{src}$, hops)
6:     return true
7: else if ($sw_{sib}$ = get_sibling_sw($sw_{root}$)) ≠ null then
8:     if $sw_{src}$.routing_table[$sw_{sib}$.addr] ≠ no_path then
9:       if $sw_{sib}$.routing_table[dst] ≠ no_path then
10:        port = get_port_to_sibling ($sw_{sib}$)
11:        $sw_{root}$.routing_table[dst] = port
12:        hops = get_hops ($sw_{sib}$,dst)
13:        set_hops($sw_{root}$, hops + 1)
14:        hops = 0
15:        port = $sw_{src}$.routing_table[$sw_{sib}$.addr]
16:        $sw_{src}$.routing_table[dst] = port
17:        get_path_length($sw_{src}$, null, dst, $sw_{root}$, hops)
18:        set_hops($sw_{src}$, hops)
19:        return true
20:       end if
21:     end if
22: end if
23: print 'SW2SW failed for $sw_{src}$ and $sw_{dst}$.'
24: return false

---

When the switch-to-switch routing function is called, the first step is to determine whether the routing table of the subtree root ($sw_{root}$) contains a path to the destination switch ($sw_{dst}$) as shown in Algorithm 2 in line 1. If it does, then the path to the destination switch is inserted into the routing table of the source switch ($sw_{src}$) and the output port for the destination switch is the same as the output port for the path to the subtree root (lines 2-6). Because the switch-to-switch routing function is called for every switch, in the end, all the paths to each unreachable destination switch will converge to the subtree. In other words, the selected subtree root is the new target for all the unreachable destination switches. The down/up turn will take place at the first possible switch located in the subtree, which can be the switch that has an upward path both to the source switch and the destination switch.

The second part of Algorithm 2 (lines 7-24) addresses the cases of complex multi-core or irregular fat trees, where the best-effort approach is employed and the subtree root does not have paths to all the destinations. On the other hand, this second part of Algorithm 2 may be skipped in a single-core fat-tree, since there can always be a path from the source switch to the subtree root, and the subtree root may have a path to every destination switch.

Algorithm 2 checks whether the subtree root has a direct neighbor (line 7), to which they are connected through horizontal links as shown in FIG. 3. Next, Algorithm 2 checks whether that neighbor, also called a sibling, has a path to the destination switch (line 8). If the sibling exists and the sibling has a path to the destination switch, a path is set both on the subtree root and the originating source switch to the destination switch through the sibling switch (lines 9-19). In other words, the target for the unreachable destination switch may still be the subtree root, and the subtree root can forward the packets to the destination switch via its sibling switch.

The SFTREE Algorithm may fail to find a path between two switches if both previous steps do not return from the function with a true value. For example, this can occur for topologies on which it is not recommended to run the fat-tree routing due to multiple link failures or very irregular connections between the nodes. An example of such a topology can be two fat-trees of different sizes connected to each other in an asymmetrical manner, e.g. from a few middle-stage switches on the larger tree to roots on the smaller one. Using various command-line parameters in OpenSM, a fat-tree routing can be forced to run on these topologies. The SFTREE Algorithm may give suboptimal routing not only in terms of performance, but also in terms of connectivity.

In accordance with an embodiment of the invention, OpenSM allows every path to be marked with a hop count to the destination. The fat-tree routing algorithm can calculate the number of hops using the switch rankings in the tree. Also, the counting can be done using a simple counter in the main routing function. These counting approaches may be unreliable for the possible zig-zag paths (i.e. paths not following the shortest hop path), when the switch-to-switch routing is totally independent of the main routing done by the fat-tree algorithm.

A recurrence function for hop calculation, e.g. get_path_length (line 17), can be used during the switch-to-switch routing. This function can iterate over the series of the switches that constitute the path, and when this function reaches the node having a proper hop count towards the destination, this function can write the hop count into the routing tables of the switches on the path.

Additionally, a subtree root can be selected in such a way that the subnet manager node (the end-node on which the subnet manager is running) is not connected to the switch marked as the subtree root. Thus, the switch-to-switch traffic can be drawn away from the subnet manager, thus not creating a bottleneck in a critical location.

Figure 4:
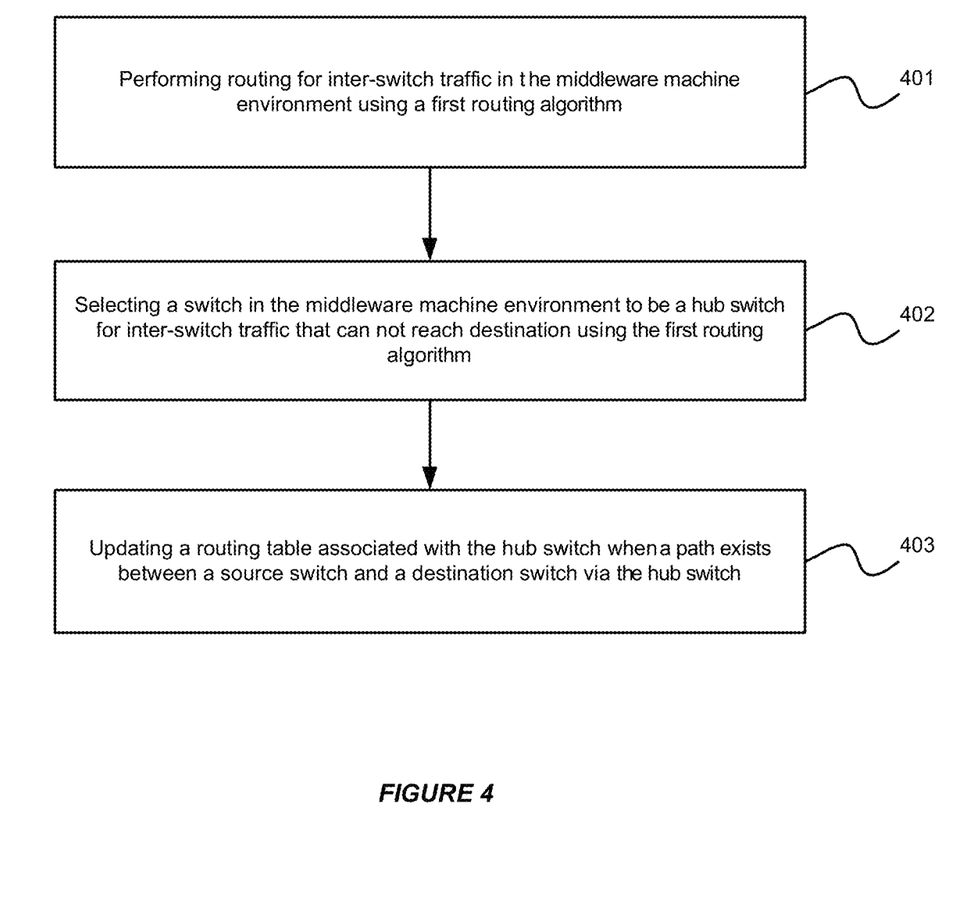
FIG. 4 illustrates an exemplary flow chart for providing deadlock free routing between switches in a fat-tree topology, in accordance with an embodiment of the invention.

FIG. 4 illustrates an exemplary flow chart for providing deadlock free routing between switches in a fat-tree topology, in accordance with an embodiment of the invention. As shown in FIG. 4, at step 401, a middleware machine environment can perform routing for inter-switch traffic in the middleware machine environment using a first routing algorithm. Then, at step 402, the middleware machine environment can select a switch in the middleware machine environment to be a hub switch for inter-switch traffic that can not reach destination using the first routing algorithm. Furthermore, at step 403, the middleware machine environment can update a routing table associated with the hub switch when a path exists between a source switch and a destination switch via the hub switch.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

APPENDIX A

The following is a proof that demonstrates that the SFTREE algorithm is deadlock free. The proof also contains exemplary definitions of the related terms.

Definition 1. By switch $s_n$, we mean a switch with a rank n. Root switches have rank n=0.

Definition 2. By a downward channel we mean a link between $s_{n-1}$ and $s_n$, where the traffic is flowing from $s_{n-1}$ to $s_n$. By an upward channel we mean a link between $s_n$ and $s_{n-1}$, where the traffic is flowing from $s_n$ to $s_{n-1}$.

Definition 3. A path is defined as a series of switches connected by channels. It begins with a source switch and ends with a destination switch.

Definition 4. A U-turn is a turn where a downward channel is followed by an upward channel.

Definition 5. A channel dependency between channel $c_i$ and channel $c_j$ occurs when a packet holding channel $c_i$ requests the use of channel $c_j$.

Definition 6. A channel dependency graph G=(V, E) is a directed graph where the vertices V are the channels of the network N, and the edges E are the pairs of channels $(c_i, c_j)$ such that there exists a (channel) dependency from $c_i$ to $c_j$.

Definition 7. By a subtree we mean a logical upside down tree structure within a fat-tree that converges to a single leaf switch s, is the single root of the subtree. A subtree expands from its root and its leaves are all the top-level switches in the fat-tree. Any upward to downward turn will leave the subtree structure.

The following theorem states the sufficient condition for deadlock freedom of a routing function.

THEOREM 1. A deterministic routing function R for network N is deadlock free if and only if there are no cycles in the channel dependency graph G.

Next, the lemmas followed by the deadlock freedom theorem of the SFTREE algorithm can be provided.

LEMMA 8. There exists at least one subtree within a fat-tree that allows full switch-to-switch connectivity using only U-turns within that subtree.

PROOF. In a fat-tree, from any leaf we can reach any other node (including all the switches) in the fabric using an up/down path or a horizontal sibling path. This is because every end-node can communicate with every other end-node, and because end-nodes are directly connected to the leaf switches, it follows that leaf switches are able to reach any other node in the topology. Consequently, if it contains no link faults, any leaf switch can act as the root of the subtree.

LEMMA 9. There can be an unlimited number of U-turns within a single subtree without introducing a deadlock.

PROOF. A subtree is a logical tree structure and two types of turns can take place within it: U-turns, i.e. downward to upward turns, and ordinary upward to downward turns. The U-turns cannot take place at the top switches in a subtree (and fat-tree) because these switches have no output upward ports. Any upward to downward turn will leave the subtree according to Definition 7.

Because a subtree is a connected graph without any cycles, it is deadlock free by itself. Any deadlock must involve U-turns external to the subtree since a U-turn is followed by an upward to downward turn leaving the subtree. All the traffic going through an up/down turn originating in the subtree will leave the subtree when the turn is made and follow only the downward channels to the destination. Such a dependency can never enter the subtree again and can never reach any other U-turn, and so, cannot form any cycle.

THEOREM 2. The sFtree algorithm using the subtree method is deadlock free.

PROOF. Following Lemma 8 and Lemma 9, a deadlock in a fat-tree can only occur if there are U-turns outside the subtree. Such a situation cannot happen due to the design of the sFtree algorithm where all U-turns take place within a subtree. The traffic leaving a subtree will not circle back to it because once it leaves the subtree, it is forwarded to the destination through downward channels only, and it is consumed, thus, no cyclic credit dependencies will occur in the topology.

What is claimed is:

1. A method for supporting traffic routing in a middleware machine environment operating on one or more microprocessors, comprising:
   using a routing algorithm that includes an up/down turn model to route inter-switch traffic from a source switch to a destination switch in a fat-tree network in the middleware machine environment, wherein the fat-tree network includes a plurality of upper-level switches and a plurality of leaf switches, each leaf switch connected to an end node;
   determining that the destination switch is unreachable to the inter-switch traffic being routed using the routing algorithm;
   selecting a particular leaf switch from the plurality of leaf switches as a hub switch;
   determining that a sibling switch of the hub switch is associated with a routing table that contains a path to the destination switch;
   setting, on each of the hub switch and the source switch, a path through the sibling switch to the destination switch; and
   updating a routing table associated with the hub switch with a path that includes the source switch, the destination switch, and the hub switch.

2. The method of claim 1, wherein the inter-switch traffic makes down/up turns when the up/down turn model fails; and wherein the down/up turns are localized to a single, deadlock free subtree.

3. The method of claim 1, wherein an output port for the destination switch is the same as an output port for the hub switch.

4. The method of claim 1, further comprising:
   using a recurrence function for hop calculation in routing the inter-switch traffic, wherein the recurrence function iterates over one or more switches that constitute the path.

5. The method of claim 1, wherein the particular leaf switch is selected as the hub switch by traversing all the leaf switches in the fat-tree network.

6. The method of claim 5, further comprising:
   for each of the leaf switches traversed, determining whether any of the switch destination addresses in a routing table associated with that leaf switch is marked unreachable; and if all the switch destinations in the routing tables are marked as reachable, the first encountered leaf switch is selected as the hub switch.

7. The method of claim 1, wherein determining whether the destination switch is unreachable to the inter-switch traffic being routed using the routing algorithm includes checking whether a routing table of the source switch contains a path to the destination switch.

8. A non-transitory machine readable storage medium having instructions stored thereon that when executed cause a system to perform the steps comprising:
   using a routing algorithm that includes an up/down model to route inter-switch traffic from a source switch to a destination switch in a fat-tree network in the middleware machine environment, wherein the fat-tree network includes a plurality of upper-level switches and a plurality of leaf switches, each leaf switch connected to an end node;
   determining that the destination switch is unreachable to the inter-switch traffic being routed using the routing algorithm;
   selecting a particular leaf switch from the plurality of leaf switches as a hub switch;
   determining that a sibling switch of the hub switch is associated with a routing table that contains a path to the destination switch;
   setting, via said sibling switch, a path to the destination switch on the source switch and the hub switch; and
   updating a routing table associated with the hub switch with a path that includes the source switch, the destination switch, and the hub switch.

9. The non-transitory machine readable storage medium of claim 8, wherein the inter-switch traffic makes down/up turns when the up/down turn model fails; and wherein the down/up turns are localized to a single, deadlock free subtree.

10. The non-transitory machine readable storage medium of claim 8, further comprising:
    wherein an output port for the destination switch is the same as an output port for the hub switch.

11. The non-transitory machine readable storage medium of claim 8, further comprising:
    using a recurrence function for hop calculation in routing the inter-switch traffic, wherein the recurrence function iterates over one or more switches that constitute the path.

12. The non-transitory machine readable storage medium of claim 8, wherein the particular leaf switch is selected as the hub switch by traversing all the leaf switches in the fat-tree network.

13. The non-transitory machine readable storage medium of claim 12, further comprising:
    for each of the leaf switches traversed, determining whether any of the switch destination addresses in a routing table associated with that leaf switch is marked unreachable; and if all the switch destinations in the routing tables are marked as reachable, the first encountered leaf switch is selected as the hub switch.

14. The non-transitory machine readable storage medium of claim 8, wherein determining whether the destination switch is unreachable to the inter-switch traffic being routed using the routing algorithm includes checking whether a routing table of the source switch contains a path to the destination switch.

15. A system for supporting inter-switch traffic routing in a middleware machine environment, comprising:
    a plurality of switches running on one or more microprocessors, wherein the plurality of switches operate to perform the steps of:
    using a routing algorithm that includes an up/down model to route inter-switch traffic from a source switch to a destination switch in a fat-tree network in the middleware machine environment, wherein the fat-tree network includes a plurality of upper-level switches and a plurality of leaf switches, each leaf switch connected to an end node;
    determining that the destination switch is unreachable to the inter-switch traffic being routed using the routing algorithm,
    selecting a particular leaf switch from the plurality of leaf switches as a hub switch,
    determining that a sibling switch of the hub switch is associated with a routing table that contains a path to the destination switch,
    setting, via said sibling switch, a path to the destination switch on the source switch and the hub switch, and
    updating a routing table associated with the hub switch with a path that includes the source switch, the destination switch, and the hub switch.

16. The system of claim 15, wherein the inter-switch traffic makes down/up turns when the up/down turn model fails; and wherein the down/up turns are localized to a single, deadlock free subtree.

17. The system of claim 15, wherein an output port for the destination switch is the same as an output port for the hub switch.

18. The system of claim 15, wherein a recurrence function is used for hop calculation in routing the inter-switch traffic, wherein the recurrence function iterates over one or more switches that constitute the path.

19. The system of claim 15, wherein the particular leaf switch is selected as the hub switch by traversing all the leaf switches in the fat-tree network.

20. The system of claim 19, for each of the leaf switches traversed, determining whether any of the switch destination addresses in a routing table associated with that leaf switch is marked unreachable; and if all the switch destinations in the routing tables are marked as reachable, the first encountered leaf switch is selected as the hub switch.

* * * * *